(12) United States Patent (10) Patent No.: US 8,893,280 B2
Jung et al. (45) Date of Patent: Nov. 18, 2014

(54) SENSITIVE DATA TRACKING USING DYNAMIC TAINT ANALYSIS

(75) Inventors: Jaeyeon Jung, Kirkland, WA (US); Yu Zhu, Berkeley, CA (US)

(73) Assignee: Intel Corporation, Santa Clara, CA (US)

( * ) Notice: Subject to any disclaimer, the term of this patent is extended or adjusted under 35 U.S.C. 154(b) by 910 days.

(21) Appl. No.: 12/638,377

(22) Filed: Dec. 15, 2009

(65) Prior Publication Data

US 2011/0145918 A1 Jun. 16, 2011

(51) Int. Cl.
*G06F 21/00* (2013.01)

(52) U.S. Cl.
USPC ............................................................ 726/25

(58) Field of Classification Search
USPC ....................................................... 726/22–26
See application file for complete search history.

(56) References Cited

U.S. PATENT DOCUMENTS

| | | | | |
|---|---|---|---|---|
| 8,127,360 | B1* | 2/2012 | Wilhelm et al. | 726/25 |
| 2008/0216175 | A1* | 9/2008 | Pike | 726/22 |
| 2008/0263672 | A1* | 10/2008 | Chen et al. | 726/26 |
| 2009/0183261 | A1* | 7/2009 | Peinado et al. | 726/24 |

OTHER PUBLICATIONS

"Symantec Positioned in the Leaders Quadrant of Gartner's Magic Quadrant for Content-Aware Data Loss Prevention", web page(retrieved on Dec. 24, 2009) available at: http://www.symantec.com/business/products/family.jsp?familyid=data-loss-prevention.

"Reconnex is now part of McAfee-Redefining Data Protection with Adaptive, Automated Information Security", web page(retrieved on Dec. 24, 2009) available at: http://www.mcafee.com/us/about/corporate/reconnex_mcafee.html.

Zone Alarm by Check Point Software Technologies Ltd, web page(retrieved on Dec. 24, 2009) available at: http://www.zonealarm.com/security/en-us/home.htm?lid=en-us.

"Little Snitch 2 Protect your Privacy", Objective Development Software GmbH, web page(retrieved on Dec. 24, 2009) available at: http://www.obdev.at/products/littlesnitch/index.html.

"The Freedom of Security", copyright of Liquid Machines, 2009, web page(retrieved on Dec. 24, 2009) available at: http://www.liquidmachines.com/.

"Panorama: A Dynamic Analysis Infrastructure for Privacy-Breaching Malware", web page(retrieved on Dec. 24, 2009) available at: http://bitblaze.cs.berkeley.edu/panorama.html.

(Continued)

*Primary Examiner* — David Le
(74) *Attorney, Agent, or Firm* — Grossman, Tucker, Perreault & Pfleger

(57) ABSTRACT

A system and method for tracking sensitive data uses dynamic taint analysis to track sensitive data as the data flows through a target application running on a computer system. In general, the system and method for tracking sensitive data marks data as tainted when the data input to the target application is indicated as sensitive. The system and method may then track the propagation of the tainted data as the data is read from and written to memory by the target application to detect if the tainted data is output from the application (e.g., leaked). Dynamic binary translation may be used to provide binary instrumentation of the target application for dynamic taint analysis to track propagation of the tainted data at the instruction level and/or the function level. Of course, many alternatives, variations, and modifications are possible without departing from this embodiment.

19 Claims, 5 Drawing Sheets

(56) References Cited

OTHER PUBLICATIONS

Wang et al. "PRECIP: Practical and Retrofittable Confidential Information Protection Against Spyware Surveillance", NDSS Symposium 2008, web page(retrieved on Dec. 24, 2009) available at: http://www.isoc.org/isoc/conferences/ndss/08/program.shtml.

Clause et al. "Dytan: A Generic Dynamic Taint Analysis Framework", proceedings of ISSTA 2007, Jul. 9-12, 2007, 11 pages.

Vachharajani et al. "RIFLE: An Architectural Framework for User-Centric Information-Flow Security", proceedings of Micro, 2004, 12 Pages.

Chow et al. "Understanding Data Lifetime via Whole System Simulation", in the proceedings of USENIX Security Symposium, 2004, 16 Pages.

Jung et al., "Privacy Scope: A Precise Information Flow Tracking System for Finding Application Leaks", Electrical Engineering and Computer Sciences, University of California at Berkley, Oct. 27, 2009, 16 pages.

Wang et al., Precip: Towards Practical and Retrofittable Confidential Information Protections, Indiana University at Bloomington, Purdue University, 17 pages.

Egele et al., "Dynamic Spyware Analysis", Security Systems Lab, Technical University Vienna, 14 pages.

Song et al., BitBlaze: A New Approach to Computer Security via Binary Analysis, ICISS 2008, 25 pages.

Dytan: A Generic Dynamic Taint Analysis Framework, College of Computing, 40 pages.

* cited by examiner

SENSITIVE DATA TRACKING USING DYNAMIC TAINT ANALYSIS

FIELD

The present disclosure relates to tracking data used by software applications, and more particularly, relates to sensitive data tracking using dynamic taint analysis.

BACKGROUND

Computer software applications, such as web browsers and word processors, receive and manipulate various types of user data including certain types of sensitive or private user data that is not meant to be shared. Examples of such sensitive data include credit card numbers, account number and confidential documents. Although the user may expect the applications to maintain the privacy of this data, many applications have leaks that allow the sensitive data to escape without user authorization or knowledge. In some cases, malicious applications (i.e., malware) intentionally seek to obtain sensitive data from other software applications. In other cases, applications merely allow data to escape as part of the normal operation. Network applications, for example, may disclose various types of personal information (e.g., search terms, user terms, system configuration) to their publishers and/or to third parties. Other applications leak information via temporary copies or cached file snapshots. The user generally does not know exactly what sensitive data these applications have leaked.

Existing tools, such as file encryption and firewalls, provide limited protection for such sensitive data when using a network. Such tools may fail to provide protection, however, once an application is authorized to read the user data and has access to output channels. Firewalls in particular may not protect leaks to a filesystem and may not block leaks to already established connections. Other existing tools for determining when sensitive data has been leaked inspect network traffic or file content and search for possible copies of sensitive data. Because these tools rely on pattern matching, they are prone to errors, for example, when the sensitive data is encrypted and then leaked. Moreover, the detection often happens after the leaks occur (e.g., leaked documents are being transmitted on the network or copied into other files).

Attempts have also been made to track sensitive data as it flows or propagates through a system, but such attempts have lacked accuracy and efficiency. Hardware-level data tracking, for example, incurs significant performance and analysis overhead, which makes it unsuitable for inspecting interactive network applications. Other data tracking tools have been built directly into the operating system using system call interposition but have been unable to track data accurately when the data is transformed by the application without using the monitored system calls.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

A system and method for tracking sensitive data, consistent with embodiments described herein, uses dynamic taint analysis to track sensitive data as the data flows through a target application running on a computer system. In general, the system and method for tracking sensitive data marks data as tainted when the data input to the target application is indicated as sensitive. The system and method may then track the propagation of the tainted data as the data is read from and written to memory by the target application to detect if the tainted data is output from the application (e.g., leaked). Dynamic binary translation may be used to provide binary instrumentation of the target application for dynamic taint analysis to track propagation of the tainted data at the instruction level and/or the function level. The system and method for tracking sensitive data may thus be used to detect data leaks in application programs independently of data transformations and without requiring the source code of the target application or modifications of an underlying operating system.

Sensitive data generally includes user data that has been designated as sensitive, for example, by a user who wishes to protect the data as private or confidential. Examples of sensitive data include financial data such as credit card data and account data, confidential documents, and confidential communications. Sensitive data may also be designated as sensitive automatically, for example, based on the type or category of the data, the manner in which the data is input, or other circumstances.

The target application may include various types of commercial software applications that process sensitive data and may include large, multi-threaded, networked applications that make heavy use of operating system services. Examples of target applications include, without limitation, web browser applications such as the Internet Explorer® browser or Firefox® browser, email, chat, or instant messaging (IM) applications such as Yahoo!® Messenger, and word processing applications such as Windows® Notepad or Microsoft® Word. The exemplary target applications may run on a Windows® operating system, such as Windows® XP, Windows® Vista, or Windows® 7. Embodiments of the system and method for tracking sensitive data described herein may also be used with other types of target applications and operating systems.

Figure 1:
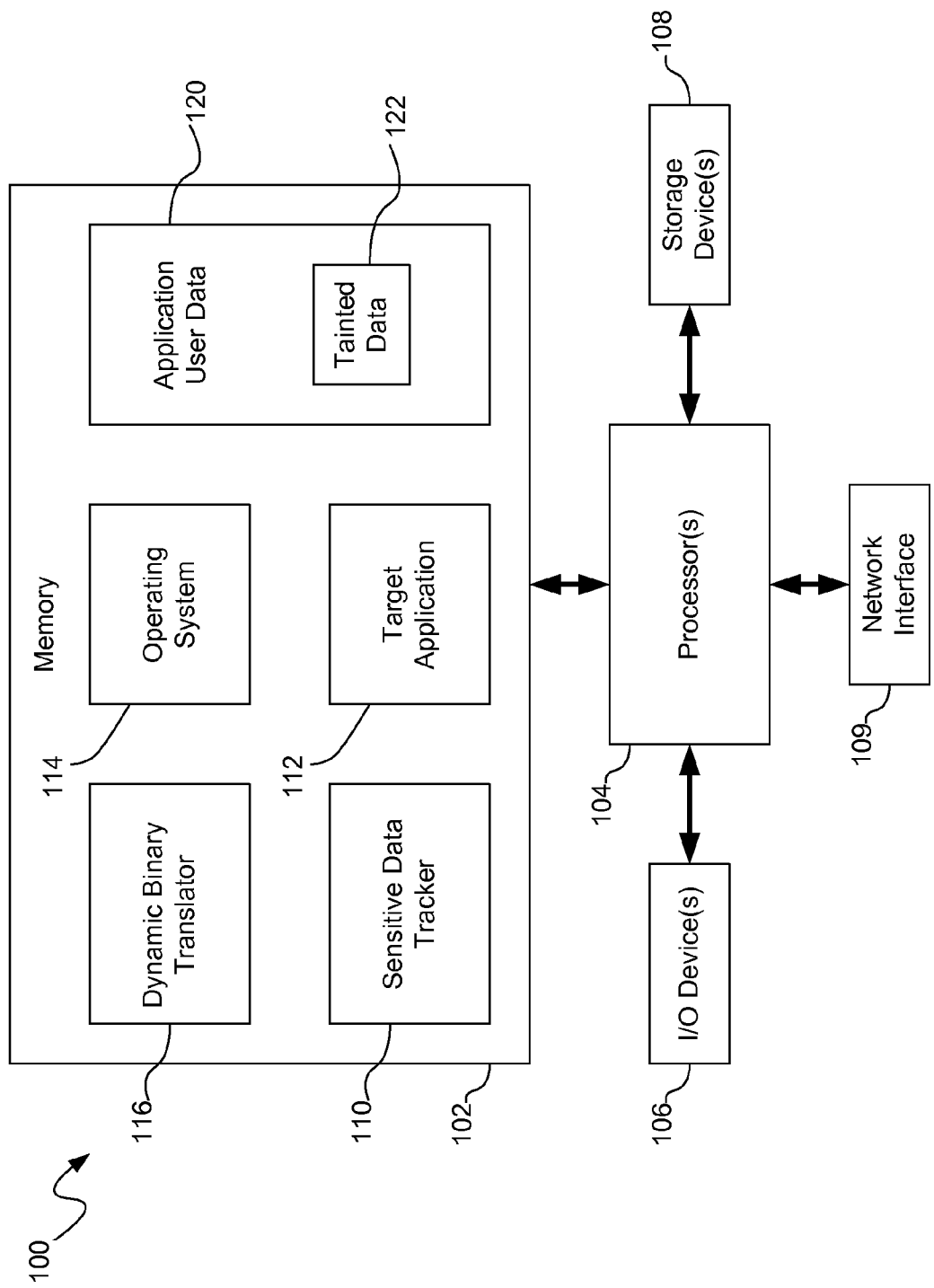
FIG. 1 is a block diagram illustrating a computer system including a sensitive data tracker to track sensitive data using dynamic taint analysis, consistent with an embodiment of the present disclosure.

Referring to FIG. 1, the system and method for tracking sensitive data using dynamic taint analysis, consistent with an embodiment of the present disclosure, may be implemented as software or instructions executed by a computer system 100. The computer system 100 includes a sensitive data tracker 110 for tracking sensitive data provided to a target application 112 via an underlying operating system 114. The computer system 100 may also include a dynamic binary translator 116 used by the sensitive data tracker 110 to provide binary instrumentation of the target application 112 to perform dynamic taint analysis. The computer system 100 may further include application user data 120 provided to the target application, which includes application user data 120 that has been marked as tainted data 122. As will be described in greater detail below, the sensitive data tracker 110 marks data designated as sensitive as tainted data 122 and then tracks the propagation of the tainted data 122 as the target application 112 processes the data and interacts with the operating system 114.

The computer system 100 generally includes memory 102 coupled to one or more processors 104. Memory 102 may store the instructions and data used for tracking the sensitive data while the processor 104 executes those instructions to process the data. In particular, memory 102 may store instructions for the sensitive data tracker 110 and the target application 112. Memory 102 may also store components of the operating system 114 (e.g., the operating system kernel) and the dynamic binary translator 116. Memory 102 may further store the application user data 120 including the tainted data 122 as the data is processed and tracked.

Examples of the computer system 100 include, without limitation, a personal computer, a work station, a server computer, a laptop or notebook computer, a hand-held computer, a personal digital assistant (PDA), a mobile telephone, or a game console. In one embodiment, the computer system 100 may be a general purpose computer running the sensitive data tracker 110, thereby forming a particular machine for tracking sensitive data.

Memory 102 may be fixed within or removable from the computer system 100. Memory 102 may include, without limitation, one or any combination of the following memory devices: random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), and universal serial bus (USB) removable memory. Memory 102 may also include virtual memory located, for example, on a hard drive.

The processor(s) 104 may include, without limitation, a central processing unit (CPU), a digital signal processor (DSP), a reduced instruction set computer (RISC), or a complex instruction set computer (CISC). The processor 104 may be part of an application specific integrated circuit (ASIC) or may be part of an application specific standard product (ASSP). The computer system 100 may also include a chipset (not shown) for controlling communications between the processor 104 and one or more of the other components of the computer system 100. In one embodiment, the computer system 100 may be based on an Intel® Architecture system and the processor 104 and chipset may be from a family of Intel® processors and chipsets. The computer system 100 may also incorporate hardware extensions to the processor 104 and chipset known as the Intel® Trusted Execution Technology to provide secure data sharing.

The computer system 100 may also include one or more input/output devices 106 and one or more storage devices 108. The input/output devices 106 may include, for example, keyboard, mouse, and display devices. The storage device(s) 108 may include, for example, a hard disk drive device for storing data files in a file system such as the Windows® NTFS file system. Those skilled in the art will recognize that the computer system 100 may also include other suitable input/output devices and storage devices. The computer system 100 may further include a network interface 109, such as a network interface card, a network adapter or a network interface controller (NIC), for connecting the computer system 100 with and enabling communication over a network. The operating system 114 generally provides an interface between the target application 110 and the input/output devices 106, the storage device(s) 108 and the network interface 109.

The dynamic binary translator 116 may include a dynamic binary translation tool capable of performing run-time binary instrumentation of software applications, such as the dynamic binary translator known as Pin developed by Intel®. Binary instrumentation instruments the executable code directly as opposed to instrumenting source code. Using the dynamic binary translator 116, the sensitive data tracker 110 may be implemented as one or more pintools and may instrument or modify the code of the target application 112 for monitoring data input to and output from the target application 112 and for tracking propagation of tainted data processed by the target application 112. The dynamic binary translator 116 may use just-in-time (JIT) compilation to instrument the code at run time and may store the instrumented code in a code cache for reuse through the runtime of the application. The sensitive data tracker 110 may instrument individual instructions of the target application 112 and/or functions called by the target application 112 such as system calls to the operating system 114 by the target application 112. As such, the instrumentation may operate at multiple levels, for example, at the instruction level and the function level, as will be described in greater detail below. The instrumentation may also be delayed until the sensitive data is first introduced into the system, as will be described in greater detail below.

The sensitive data tracker 110 may thus include one or more instrumentation routines and analysis routines. Instrumentation routines define where an instrumentation is inserted and may be executed to instrument the instructions and/or functions (e.g., system calls) involved with sensitive data tracking. Analysis routines define what to do when an instrumentation is activated and may be executed whenever the application encounters the instrumented instructions and/or functions (e.g., system calls) to perform the monitoring and taint propagation tracking. Other types of dynamic binary translator tools may also be used such as the types known as DynamoRIO, StarDBT, and Valgrind.

Figure 2:
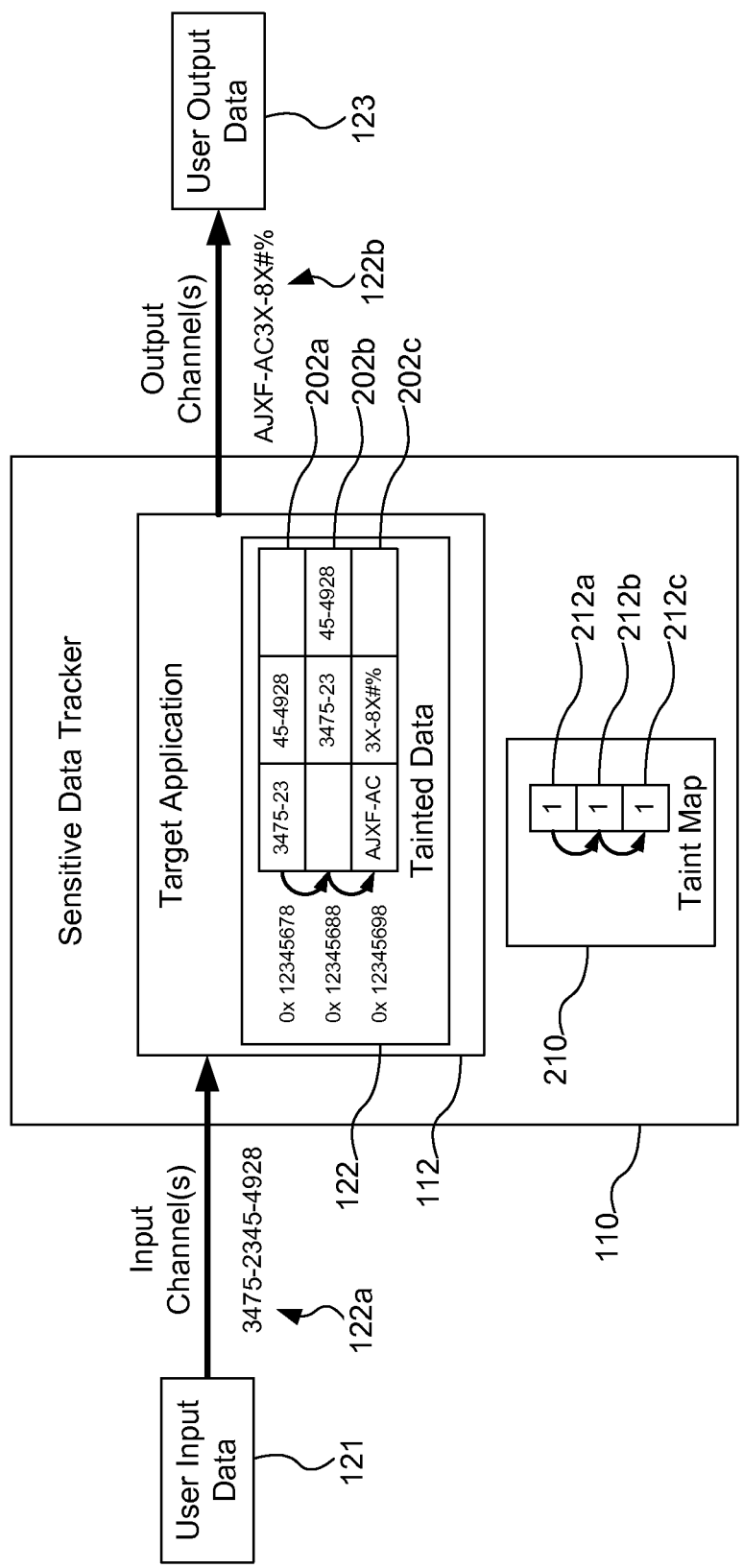
FIG. 2 is a functional block diagram illustrating sensitive data tracking using dynamic taint analysis, consistent with an embodiment of the present disclosure.

Referring to FIG. 2, operation of the system and method for tracking sensitive data is described in greater detail. In general, the sensitive data tracker 110 monitors user input data 121 provided on input channels, marks tainted data 122, tracks propagation of the tainted data 122 as the data is processed by the target application 112, and monitors output data 123 on output channels to determine if the output data 123 includes the tainted data 122. As used herein, an input channel refers to a route or path by which user data is input to the target application 112 from a source external to the application. Examples of input channels include, without limitation, keystrokes provided by a keyboard, files on a file system, network buffers and sockets, and USB devices. As used herein, an output channel refers to a route or path by which user data is output from a target application 112 to a destination external to the application. Examples of output channels include, without limitation, network buffers and sockets, files, Windows® registry keys/values, shared memory, and system messages.

Monitoring the input channels and the output channels may include monitoring the instructions or functions (e.g., system calls) responsible for passing input data 121 to the target application 112 from the external source and passing output data 123 from the target application 112 to the external destination. In one embodiment, the input channels and output channels may be monitored by instrumenting system calls responsible for passing data between the input and output channels and the target application 112 via the operating system. The sensitive data tracker 110 may thus interpose on these system calls when the target application 112 makes the calls to the operating system, as will be described in greater detail below.

The sensitive data tracker 110 monitors the user data on the input channel(s) for a sensitive data indicator and marks user data associated with the sensitive data indicator as tainted data. The sensitive data indicator may include any element capable of indicating that a certain portion of input data is deemed sensitive. In one embodiment, the sensitive data indicator may be provided by the user when the user inputs data deemed by the user to be sensitive. For example, the sensitive data indicator may include one or more sensitive data indicator keystrokes demarcating sensitive data typed by a user on a keyboard or may include a sensitive data attribute associated with a file that contains data deemed to be sensitive. The sensitive data indicator may also be provided automatically, for example, based on the type or category of the data, allowing automatic tagging of sensitive data. For example, data entered into a certain field of the target application 112 (e.g., a credit card or account number field) may be indicated as sensitive with a field descriptor acting as a sensitive data indicator.

When the input channel includes keystrokes provided by a keyboard, the sensitive data tracker 110 may monitor keyboard data for sensitive data indicator keystrokes as the user types data into the target application 112 using the keyboard. In one embodiment, the sensitive data tracker 110 may monitor the keyboard data by interposing on system calls responsible for obtaining data from the keyboard, such as calls made to the Windows® message DispatchMessage( ) responsible for passing keyboard data from the Windows® operating system to the target application 112. For example, a designated combination of indicator keystrokes (e.g., Alt+F9 and Alt+F10) may be used to demarcate the beginning and ending of the sensitive data typed between the indicator keystrokes. As the user types characters using keystrokes on a keyboard, the sensitive data tracker 110 may examine the Windows® message to look for messages indicating a key press (e.g., WM_KEYDOWN). If these characters are located between the designated combination of keystrokes (e.g., ALT+F9 and ALT+F10), these characters are marked as tainted data 122 and tracked throughout application execution.

When the input channel includes files on a file system, the sensitive data tracker 110 may monitor file attributes for sensitive data attributes as files are accessed by the target application 112. The sensitive data tracker 110 may monitor the file attributes by interposing on system calls responsible accessing files on a file system such as calls made to the CreateFile function used by the Windows® operating system.

The sensitive data tracker 110 may also use functions or system calls for reading file attributes, such as the NTQueryEaFile( ) function used to read extended attributes of a file in the Windows® NTFS file system. If the file attributes read from a file being accessed by the target application 112 include a sensitive data attribute tagging the file as sensitive, the data from that file will be marked as tainted data 122 and tracked throughout application execution.

The sensitive data tracker 110 tracks propagation of the tainted data 122 as the tainted data is read from and written to memory locations 202a-c. Memory locations 202a-c may include locations in memory 102, registers in the processor 104 (or in a chipset), or any other memory locations in hardware of the computer system shown in FIG. 1. The propagation of the tainted data 122 may be tracked using a taint map 210 including taint tags corresponding to the tainted data 122. The taint map 210 may also be stored in memory 102 shown in FIG. 1. As the tainted data 122 is moved between memory locations 202a-c, the corresponding taint tags are moved between corresponding locations 212a-c in the taint map 210. In one embodiment, the taint map 210 may include taint tags (e.g., 1 bit) corresponding to bytes of tainted data 122, thereby tracking propagation of tainted data 122 with byte level granularity.

The taint map 210 may be implemented as a statically allocated table with a statically configurable size (e.g., 8 MB) including bits representing taint tags of bytes of tainted data 122 in memory (e.g., in virtual memory). For example, virtual memory space including the tainted data may be mapped into the taint map table by left shift operations. When 8 MB is used for the taint map table, the virtual memory storing the tainted data 122 is 4 GB and the sensitive data tracker 110 is implemented using byte level granularity, for example, the virtual address may be left shifted by 6 bits to obtain the tag position in the taint map table. Other types of data structures may also be used to map taint tags to the tainted data.

The use of the taint map 210 allows tracking of the propagation of tainted data independent of any transformations that might occur (e.g., encryption of the data). As shown, for example, a tainted data element 122a may be transformed when it is written to a memory location 202c and the transformed tainted data element 122b may be output from the target application 112. The taint map 210 includes a taint tag at a location 212c corresponding to the memory location 202c including the transformed tainted data element 122b even though the data has been transformed.

As mentioned above, the sensitive data tracker 110 may track propagation of the tainted data by instrumenting the target application 112 for dynamic taint analysis at different levels. Using instruction-level instrumentation, the target application 112 may be instrumented such that propagation of the tainted data 122 is tracked as each instrumented instruction is executed. In general, each time an instruction that outputs data accesses input data that is tainted, any outputs that may have been influenced by the tainted data may also be marked as tainted (e.g., by updating the taint map 210 accordingly). In other words, an analysis routine inserted during instrumentation may inspect the input data used by the instruction and taints the output data if necessary (i.e., based on a taint analysis policy). Using function-level instrumentation, the target application 112 may be instrumented such that propagation of the tainted data 122 is tracked as each function is called and completed without tracking taint propagation as each instruction of the function is executed.

The sensitive data tracker 110 may use on-demand instrumentation to defer at least a portion of the instrumentation of the target application 112 until sensitive data is first introduced into the system. When the target application 112 is started, for example, the sensitive data tracker 110 may perform no instruction-level instrumentation and only limited function-level instrumentation to monitor the various input channels on which sensitive data may be introduced (e.g., by keyboard input or opening a file). The receipt of sensitive data to be marked as tainted may act as a trigger condition that causes the instrumentation of application instructions and functions for taint propagation (i.e., taint propagation instrumentation). In response to the trigger condition, for example, the sensitive data tracker may invalidate all existing instrumentations and re-instrument as necessary. Where Pin is used as the dynamic binary translator, the sensitive data tracker may call PIN_RemoveInstrumentation( ) to remove the instrumented code from the code cache and invoke the new instrumentation including the taint propagation instrumentation. Delaying the instrumentation may substantially reduce the number of instructions to instrument for taint propagation, thereby improving performance.

Instruction-level instrumentation may include generic instrumentation and instruction-specific instrumentation. For example, the instruction semantics (e.g., opcode, operand type) may be used at the instrumentation time to instrument some instructions for generic taint analysis and to instrument other instructions for specific taint analysis based on the instruction. Generic taint analysis tracks propagation of tainted data for instructions using a generic data dependency policy. An instruction analysis API provided by Pin, for example, may be used to determine the registers and memory regions read and written by an instruction. If the output from an instruction of the target application is a direct copy or transformation of the input to the instruction, then the taint is propagated (i.e., the output is tainted if the input is tainted). The use of generic taint propagation allows a wide range of instructions to be instrumented for taint propagation without a specific handler for each type of instruction.

Instruction-specific taint analysis tracks propagation of tainted data for certain special instructions using an instruction specific policy based on the mode of operation of the instruction. Examples of special instructions that may be instrumented for instruction-specific taint propagation include instructions (e.g., XOR, SUB, SBB, AND) used to clear a register if the operands are the same, the MOV instruction, instructions following the REP prefix, and index registers. The instructions used to clear registers are not instrumented using generic data dependency propagation because they perform clear operations and do not propagate tainted data. The MOV instruction represents a common case of propagating tainted data between registers and memory regions and may be instrumented in a manner that reduces the time needed to analyze each MOV instruction using a generic data dependency propagation. Operations following the REP prefix are repeated until a register counter counts down to 0 and the counters may be excluded from the taint propagation analysis such that they are not the source or the destination of taint even though they are read and written. When an x86 instruction addresses memory, the instruction computes the final address using base and index values specified using base and index registers. The index registers may be instrumented using a taint propagation policy that propagates tainted data in base and index registers to a destination if both are present. If only base registers are used, the propagation may be ignored.

The use of instruction-specific instrumentation may thus improve the accuracy and efficiency of the taint tracking. Other instructions may also be instrumented for instruction-specific taint analysis, for example, if the instruction does not propagate taint or if the accuracy and efficiency may be improved with an instruction specific policy. In other embodiments, however, generic taint analysis may be used for all instructions.

Figure 3:
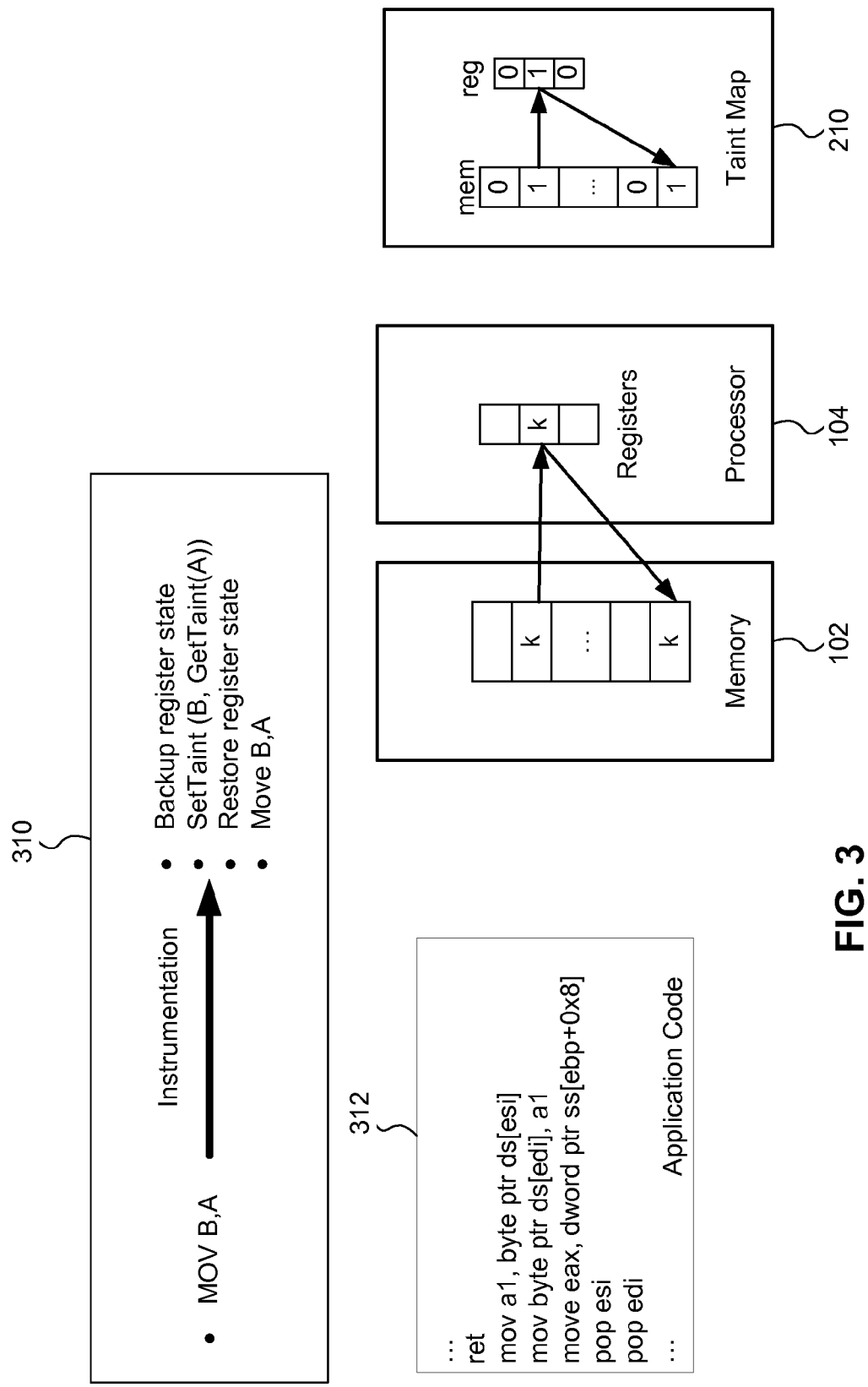
FIG. 3 is a schematic diagram illustrating the propagation of tainted data using an exemplary instruction-level instrumentation for dynamic taint analysis, consistent with an embodiment of the present disclosure.

FIG. 3 illustrates one example of taint propagation using instruction-level instrumentation of an instruction of the target application. When an instruction is instrumented for dynamic taint analysis, a taint analysis routine may be inserted for execution with the instruction and the instrumented code may be placed in a code cache for reuse throughout the application runtime. When the instrumented instruction is executed, the register state may be backed up, the taint analysis routine may be executed, the register state may be restored, and the application instruction may be executed.

In particular, FIG. 3 shows an instruction instrumentation 310 for a MOV instruction, an application code segment 312 that includes MOV instructions, the propagation of tainted data through memory locations (e.g., in memory 102 and registers in the processor 104) as a result of executing the MOV instructions in the application code segment 312, and the corresponding movement of taint tags in the taint map 210. In the illustrated example, the MOV B, A instruction moves data between registers and/or memory locations and the instrumented MOV B, A instruction includes a taint analysis routine that moves corresponding taint tags in the taint map 210. When the instrumented target application code is executed, for example, tainted data is moved between memory locations with corresponding updates to the taint map 210. In particular, the tainted data (k) is copied from a memory location to a register (a1) and the taint map entry corresponding to the register (a1) is updated accordingly. The content of the register (a1) is then copied to a different memory location and the taint map is again updated to reflect the data movement.

As mentioned above, the sensitive data tracker 110 may also instrument the target application 112 at the function level. When a function is instrumented for dynamic taint analysis, a taint analysis routine may be inserted for execution with the calling of the function. Functions called by the target application may be instrumented based on the semantics of the function such that dynamic taint analysis is performed for the function without analyzing each of the instructions of the function.

Function-level instrumentation may track taint propagation through a function using a function summary that summarizes the propagation of tainted data that results from executing the instructions of a function. The function summaries may be used to instrument frequently called functions and/or system calls to the operating system kernel, thereby improving the efficiency of the system. When a function is called and a function summary is available, instruction-level taint propagation may be disabled while running or executing the function. When Pin is used as the dynamic binary translator, for example, conditional inlining may be used to instrument instructions of the target application conditionally such that the instrumented code is not injected for analysis when a function summary is available.

At the end of the execution of the function, a patching function may be performed to track the propagation of tainted data (i.e., to propagate the taint tags) between inputs and outputs of the function, for example, by updating the taint map upon returning from execution of the function. The patching function may be run for functions that produce output in output parameters or by modifying memory locations. For functions that do not produce output or do not have any side effect and for functions whose only outputs are independent of the inputs, a patching function may not be necessary because tainted data has not been propagated by the function.

After the function-level taint propagation analysis, the instruction level taint tracking may be resumed.

One example of a function that may be instrumented for function-level taint propagation is the function wcsncpy called by the Internet Explorer® web browser to copy up to N wide character strings from a source buffer to a destination buffer. After the wcsncpy function terminates, the sensitive data tracker performs a taint propagation operation to the taint map that mimics the logic of the wcsncpy function (i.e., copies taint information from the source to the destination up to N wide characters). By disabling the taint propagation for each instruction inside the function, the cost of executing an analysis routine for each of the instructions may be eliminated and the function may be executed without interruption, thereby improving performance.

Figure 4:
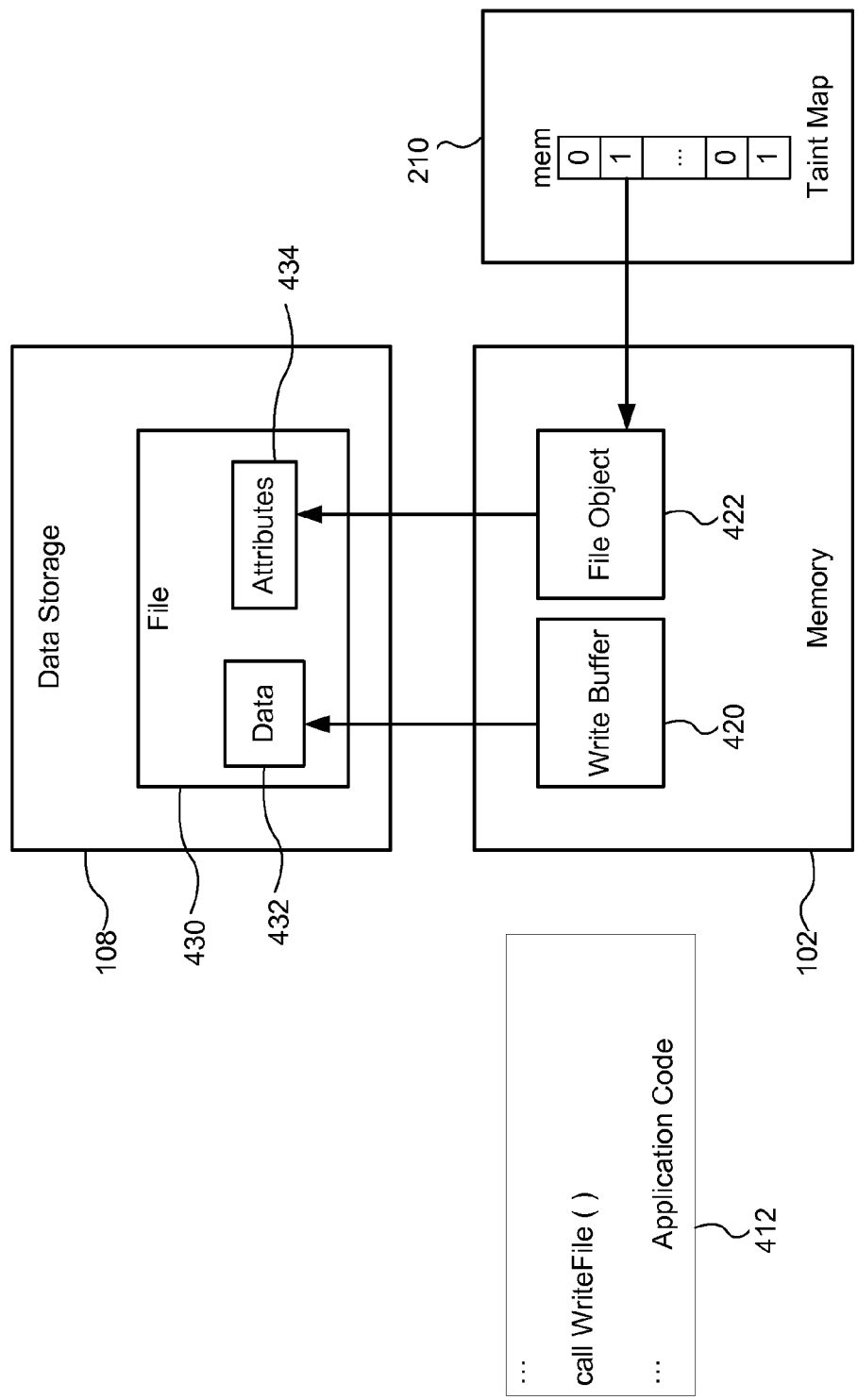
FIG. 4 is a schematic diagram illustrating the propagation of tainted data using an exemplary function-level instrumentation for dynamic taint analysis, consistent with an embodiment of the present disclosure

FIG. 4 illustrates one example of taint propagation using function-level instrumentation for a system call to an operating system kernel function called by the target application. In general, when a function-level instrumentation has been inserted for a system call, the parameters to the instrumented kernel function may be captured when the call is made and a corresponding object may be created. When a system call is made to a kernel function to access an operating system resource, for example, an object or data structure representing the system resource may be created. Examples of kernel objects include file handles and memory mapped regions. When the parameters to the function are tainted, the taint analysis routine may then propagate taint from the taint map to the object.

As other system calls are made by the target application to the operating system functions, additional objects may be created and the taint may be propagated from one object to another object. In other words, some kernel states may be mirrored and used to propagate taint with object-level granularity. The sensitive data tracker may maintain a list of tainted kernel level objects (e.g., object handles in a Windows® operating system) including attributes of these objects such as size and/or location in memory. Using function-level instrumentation of the target application and object-level taint propagation for operating system kernel functions allows propagation of tainted data to be tracked without having to instrument and track instructions within the operating system kernel.

Using the file system as an example, function-level instrumentation may be performed for kernel functions used to access the files. Functions such as the CreateFile, WriteFile, and CloseHandle functions used by the Windows® operating system may be instrumented to detect opening of a tainted file or writing tainted data to a file. As shown in FIG. 4, for example, when an application code segment 412 calls the WriteFile ( ) function to write to a file, a parameter for a write buffer 420 may be captured and propagation of tainted data may be tracked using an object 422 (e.g., a file handle object) created for the file (e.g., in memory 102). In particular, when the WriteFile ( ) function is called with a tainted write buffer 420 as a parameter, taint may flow from the taint map 210 to the file object 422. The taint information may also be propagated to and stored persistently in the file 430, for example, using file attributes 434 to indicate that the data 432 in the file 430 is tainted. The sensitive data tracker may set the file attributes, for example, using a system call such as the NTSetEaFile( ) function used to set extended attributes of a file in the Windows® NTFS file system Other file system functions that map files to memory may also be instrumented, such as the CreateFileMapping ( ), and MapViewOfFile ( ) functions used by the Windows® operating system to map files into user address space. These function calls may be monitored and the location where the files are mapped may be recorded, for example, using memory mapping objects. Taint may then be propagated from an object file to a memory mapping file using object-level propagation.

Referring back to FIG. 2, the sensitive data tracker 110 monitors the output channel(s) to determine if any of the tainted data 122 has been propagated by the target application 112 to the output channel(s), for example, as the data is written to a file or sent on a network. Tainted data 122 may be propagated to an output channel, for example, when the tainted data 122 is passed to a buffer containing data to be sent to that output channel (e.g., a buffer containing data to be written to a file or sent to a network socket). If the sensitive data tracker 110 determines that tainted data 122 has been propagated to an output channel, the sensitive data tracker 110 may provide a notification to the user indicating a potential leak of sensitive data and/or may log the potential leak. Such a notification or log entry may include a date/time stamp that the data was output and an identification of the output channel. If the sensitive data has been propagated to an output channel without authorization, the sensitive data tracker 110 may also block the leak, for example, by disabling the function responsible for propagation of the tainted data to the output channel.

As mentioned above, the sensitive data tracker 110 may monitor output channels by interposing on system calls responsible for passing data to the output channels. When the output channel includes a network output channel, for example, the sensitive data tracker 110 may monitor the network output channel by interposing on a system call responsible for sending data over the network channel such as calls made to the send ( ) function used by the Windows® operating system for sending data on a connected socket. When the output channel includes a file, the sensitive data tracker 110 may monitor the file by interposing on a system call responsible for writing data to the file such as the WriteFile ( ) function used by the Windows® operating system for writing data to a file. If the data being sent or written is marked as tainted (e.g., in the taint map 210), the sensitive data tracker 110 may provide a notification, log the event and/or stop the function.

Figure 5:
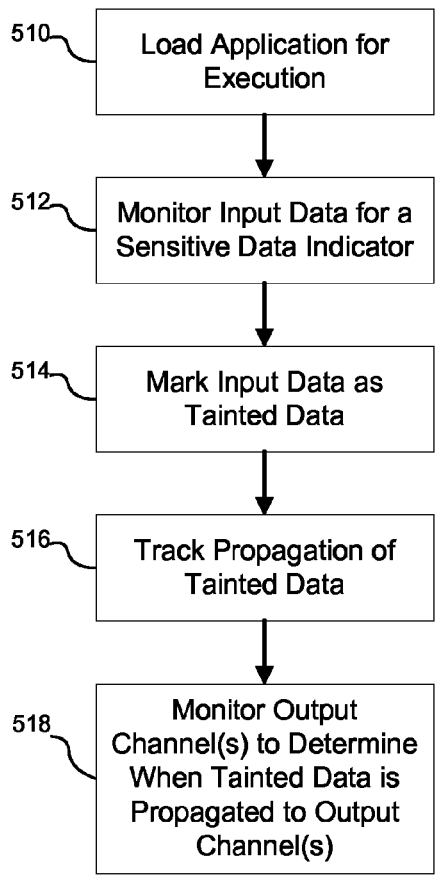
FIG. 5 is a flow chart illustrating a method for sensitive data tracking using dynamic taint analysis, consistent with an embodiment of the present disclosure.
Figure 6:
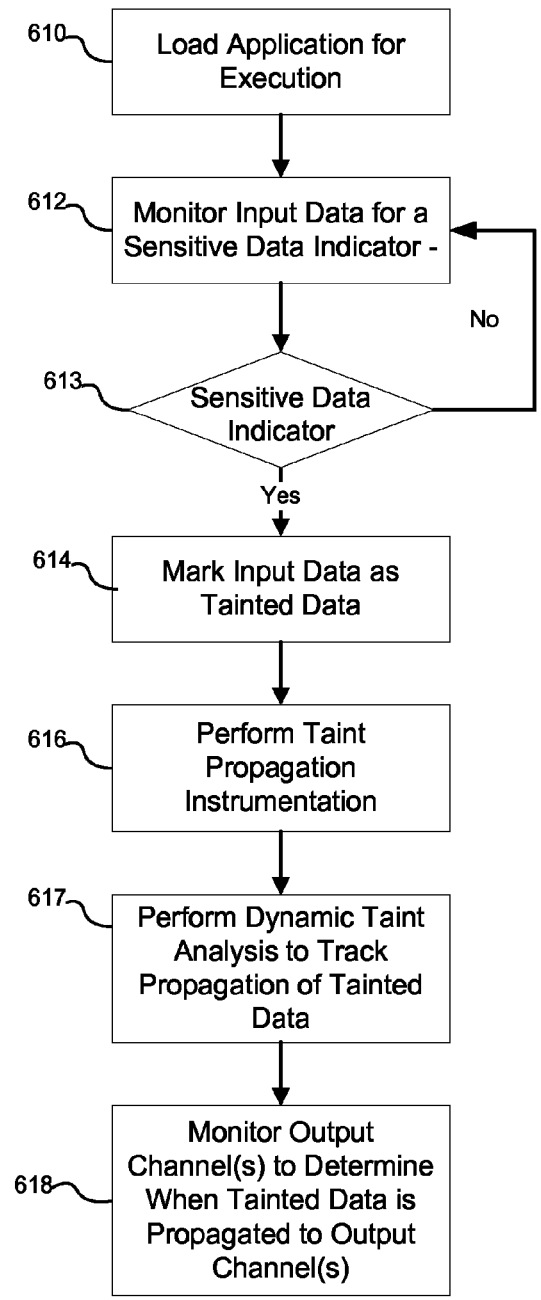
FIG. 6 is a flow chart illustrating a method for sensitive data tracking with on-demand instrumentation, consistent with another embodiment of the present disclosure.

Methods for tracking sensitive data, consistent with embodiments described herein, are illustrated in FIGS. 5 and 6. These methods may be implemented using the computer system, dynamic taint analysis, dynamic binary translation, and instrumentation techniques described above. The methods illustrated in FIGS. 5 and 6 may also be implemented using other suitable systems and techniques.

FIG. 5 illustrates generally a method of tracking sensitive data flowing through a target application running on a computer system. According to this method, the target application is loaded 510 for execution by the computer system and input data received on one or more input channels of the computer system is monitored 512 for a sensitive data indicator. The input channels may include keystrokes on a keyboard and/or files opened in a file system, and the input data may be monitored by interposing on function calls responsible for passing input data from these channels to the target application, for example, as described above.

The data associated with a sensitive data indicator may be marked 514 as tainted data and the propagation of the tainted data may be tracked 516 as the data is processed. The propagation of tainted data may be tracked by instrumenting the target application for dynamic taint analysis at the instruction level and/or the function level, for example, as described above. The instruction-level taint analysis may include generic taint analysis or instruction-specific taint analysis using byte-level taint propagation as described above. The function-level taint analysis may include an operating system kernel function taint analysis using object-level taint propagation as described above.

The output channel(s) may also be monitored 518 to determine when the tainted data is propagated to an output channel. Output channels may include files in a file system and/or network output channels and may be monitored by interposing on function calls responsible for passing output data from the target application to the output channels, for example, as described above.

FIG. 6 illustrates a method of tracking sensitive data using on-demand instrumentation wherein the taint propagation instrumentation is deferred from load time to when the taint tracking is needed (e.g., when tainted data is introduced into the system). According to this method, the target application is loaded 610 for execution and the input data received on one or more input channels is monitored 612 for a sensitive data indicator. If a sensitive data indicator is detected 613, the input data associated with the sensitive data indicator is marked 614 as tainted data and taint propagation instrumentation is performed 616 (i.e., after the tainted data is introduced into the system). Dynamic taint analysis is then performed 617 to track propagation of the tainted data as the data is processed and output channels are monitored 618 to determine when the tainted data is propagated to an output channel.

Certain embodiments described herein may be provided as a tangible machine-readable medium storing machine-executable instructions that, if executed by a machine, cause the machine to perform the methods and/or operations described herein. The tangible machine-readable medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing platform, device or system, computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware.

Consistent with one embodiment, a method is provided for tracking sensitive data through a target application running on a computer system. The method includes: loading a target application for execution by a computer system; monitoring input data received on at least one input channel of the computer system for a sensitive data indicator; marking the input data associated with the sensitive data indicator as tainted data when the input data is provided to the target application; tracking propagation of the tainted data as the target application executes and the tainted data is read from and written to memory locations in the computer system; and monitoring at least one output channel of the computer system to determine if the tainted data is propagated to the at least one output channel.

Consistent with another embodiment, a tangible computer-readable medium includes instructions stored thereon which, when executed by a computer system, cause the computer system to perform the following operations: monitoring input data received on at least one input channel of the computer system for a sensitive data indicator; marking the input data associated with the sensitive data indicator as tainted data when the input data is provided to the target application; tracking propagation of the tainted data as the target application executes and the tainted data is read from and written to memory locations in the computer system; and monitoring at least one output channel of the computer system to determine if the tainted data is propagated to the at least one output channel.

Consistent with a further embodiment, a system includes a memory to store a target application and a sensitive data tracker. The sensitive data tracker is configured to monitor input data received on at least one input channel of the computer system for a sensitive data indicator, to mark the input data associated with the sensitive data indicator as tainted data when the input data is provided to the target application, to track propagation of the tainted data as the target application executes and the tainted data is read from and written to memory locations in the computer system, and to monitor at least one output channel of the computer system to determine if the tainted data is propagated to the at least one output channel. The system further includes a processor to execute instructions of the target application and the sensitive data tracker.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method of tracking sensitive data through a target application running on a computer system, the method comprising:
upon loading a target application for execution by a computer system, initiating function-level instrumentation including monitoring input data received on at least one input channel of the computer system for a sensitive data indicator;
marking the input data associated with the sensitive data indicator as tainted data when the input data is provided to the target application;
upon receipt of the tainted data at said computer system, initiate tracking propagation of the tainted data as the target application executes and the tainted data is read from and written to memory locations in the computer system, wherein tracking propagation of the tainted data comprises performing instrumentation of the target application instructions and functions such that the tainted data is tracked as instructions of the target application are executed; and
monitoring at least one output channel of the computer system to determine if the tainted data is propagated to the at least one output channel.

2. The method of claim 1 wherein monitoring input data comprises monitoring keystrokes, wherein the sensitive data indicator includes at least one indicator keystroke demarcating sensitive data, and wherein marking the input data as tainted data comprises marking the data demarcated by the at least one indicator keystroke.

3. The method of claim 1 wherein monitoring input data comprises monitoring data files, wherein the sensitive data indicator includes a sensitive data attribute associated with a data file, and wherein marking the input data as tainted data comprises marking the data in a data file with the sensitive data attribute.

4. The method of claim 1 wherein marking data comprises establishing a taint map that maps taint tags to the tainted data in the memory locations, and wherein tracking propagation of the tainted data comprises moving the taint tags in the taint map corresponding to movements of the tainted data between the memory locations.

5. The method of claim 1 wherein tracking propagation of the tainted data further comprises performing dynamic taint analysis as the application is executed.

6. The method of claim 5 wherein the dynamic taint analysis is performed using dynamic binary translation.

7. The method of claim 1, wherein performing instrumentation of the target application includes performing at least one generic instruction-level instrumentation of the target application, performing at least one instruction-specific instruction-level instrumentation of the target application, and performing at least one function-level instrumentation of the target application.

8. The method of claim 1 wherein tracking propagation of the tainted data further comprises tracking propagation of the tainted data using instruction-level taint tracking such that the tainted data is tracked as instructions of the target application are executed.

9. The method of claim 8 wherein the instruction-level taint tracking comprises generic taint tracking that tracks the tainted data based on the output data of an instruction being executed being dependent upon the input data to the instruction being executed.

10. The method of claim 8 wherein the instruction-level taint tracking comprises instruction-specific taint tracking that tracks the tainted data based on an operation performed by the instruction being executed.

11. The method of claim 1 wherein tracking propagation of the tainted data further comprises tracking propagation of the tainted data using function-level taint tracking such that the tainted data is tracked as functions are called by the target application.

12. The method of claim 11 wherein the function-level taint tracking tracks tainted data for system calls to an operating system kernel.

13. The method of claim 1 wherein monitoring input channels and output channels comprises interposing on system calls to functions responsible for passing data from the input channels and to the output channels.

14. The method of claim 1 further comprising displaying a notification when tainted data is propagated to the at least one output channel.

15. The method of claim 1 further comprising blocking data from being output from the at least one output channel when tainted data is propagated to the at least one output channel.

16. A tangible computer-readable medium comprising instructions stored thereon which, when executed by a computer system, cause the computer system to perform the following operations:
   initiating function-level instrumentation upon loading a target application for execution by said computer system including monitoring input data received on at least one input channel of the computer system for a sensitive data indicator;
   marking the input data associated with the sensitive data indicator as tainted data when the input data is provided to the target application;
   upon receipt of the tainted data at said computer system, initiate tracking propagation of the tainted data as the target application executes and the tainted data is read from and written to memory locations in the computer system, wherein tracking propagation of the tainted data comprises performing instrumentation of the target application instructions and functions such that the tainted data is tracked as instructions of the target application are executed; and
   monitoring at least one output channel of the computer system to determine if the tainted data is propagated to the at least one output channel.

17. The medium of claim 16 wherein tracking propagation of the tainted data comprises performing binary instrumentation of the target application and performing dynamic taint analysis as the application is executed.

18. A system comprising:
   a memory to store a target application and a sensitive data tracker, wherein the sensitive data tracker is configured to initiate function-level instrumentation upon loading said target application for execution by said computer system including monitoring input data received on at least one input channel of the computer system for a sensitive data indicator, to mark the input data associated with the sensitive data indicator as tainted data when the input data is provided to the target application, to initiate track propagation of the tainted data upon receipt of the tainted data as the target application executes and the tainted data is read from and written to memory locations in the computer system, wherein tracking propagation of the tainted data comprises performing instrumentation of the target application instructions and functions such that the tainted data is tracked as instructions of the target application are executed, and to monitor at least one output channel of the computer system to determine if the tainted data is propagated to the at least one output channel; and
   a processor to execute instructions of the target application and the sensitive data tracker.

19. The system of claim 18 wherein the sensitive data tracker comprises at least one instrumentation routine configured to instrument the target application and at least one analysis routine configured to perform dynamic taint analysis as the target application executes.

* * * * *